US007655056B2

(12) United States Patent
Devos

(10) Patent No.: US 7,655,056 B2
(45) Date of Patent: *Feb. 2, 2010

(54) HYDROGEN GENERATING APPARATUS

(75) Inventor: John A. Devos, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 60 days.

This patent is subject to a terminal disclaimer.

(21) Appl. No.: 11/985,633

(22) Filed: Nov. 16, 2007

(65) Prior Publication Data

US 2008/0070071 A1 Mar. 20, 2008

Related U.S. Application Data

(62) Division of application No. 10/236,430, filed on Sep. 6, 2002, now Pat. No. 7,316,719.

(51) Int. Cl.
*B01J 7/00* (2006.01)
*C10J 3/46* (2006.01)

(52) U.S. Cl. .......................... 48/61; 48/127.1; 48/127.9; 48/197 R; 48/198.7; 429/17; 429/19; 429/13; 429/12; 429/20; 423/657; 422/211

(58) Field of Classification Search .................. None
See application file for complete search history.

(56) References Cited

U.S. PATENT DOCUMENTS

| 3,594,232 | A | 7/1971 | Spahrbier |
| 5,928,409 | A | 7/1999 | Sirkar |
| 6,322,917 | B1 | 11/2001 | Acker |
| 2003/0009942 | A1* | 1/2003 | Amendola et al. ............. 48/61 |
| 2003/0235724 | A1 | 12/2003 | Ord et al. |

FOREIGN PATENT DOCUMENTS

| DE | 1667346 | 6/1971 |
| EP | 1170249 A1 | 1/2002 |
| WO | WO 0151410 A1 | 7/2001 |
| WO | WO 0174710 A1 | 10/2001 |
| WO | WO 0230810 A1 | 4/2002 |

* cited by examiner

*Primary Examiner*—Jennifer Michener
*Assistant Examiner*—Kaity V. Handal

(57) ABSTRACT

A hydrogen generating apparatus includes a chemical reaction chamber, a chemical solution reservoir, an unpowered pressure-producing member for moving a chemical solution from the chemical solution reservoir to the chemical reaction chamber, and a catalyst bed in the chemical reaction chamber.

15 Claims, 4 Drawing Sheets

HYDROGEN GENERATING APPARATUS

RELATED APPLICATION

The present application is a divisional application and claims the priority under 35 U.S.C. §120 of U.S. patent application Ser. No. 10/236,430, filed 6 Sep. 2002 now U.S. Pat. No. 7,316,719. U.S. patent application Ser. No. 10/236,430 is incorporated herein by reference in its entirety.

BACKGROUND

Over the past century the demand for energy has grown exponentially. With the growing demand for energy, many different energy sources have been explored and developed. One of the primary sources for energy has been, and continues to be, the combustion of hydrocarbons. However, the combustion of hydrocarbons is usually incomplete combustion and releases non-combustibles that contribute to smog as well as other pollutants in varying amounts.

As a result of the pollutants created by the combustion of hydrocarbons, the desire for cleaner energy sources has increased in more recent years. With the increased interest in cleaner energy sources, fuel cells have become more popular and more sophisticated. Research and development on fuel cells has continued to the point where many speculate that fuel cells will soon compete with the gas turbine generating large amounts of electricity for cities, the internal combustion engine powering automobiles, and batteries that run a variety of small and large electronics.

Fuel cells conduct an electrochemical energy conversion of hydrogen and oxygen into electricity and heat. Fuel cells are similar to batteries, but they can be "recharged" while providing power.

Fuel cells provide a DC (direct current) voltage that may be used to power motors, lights, or any number of electrical appliances. There are several different types of fuel cells, each using a different chemistry. Fuel cells are usually classified by the type of electrolyte used. The fuel cell types are generally categorized into one of five groups: proton exchange membrane (PEM) fuel cells, alkaline fuel cells (AFC), phosphoric-acid fuel cells (PAFC), solid oxide fuel cells (SOFC), and molten carbonate fuel cells (MCFC).

PEM Fuel Cells

The PEM fuel cells are currently believed to be the most promising fuel cell technology, and use one of the simplest reactions of any fuel cell. Referring to FIG. 1, a PEM fuel cell will typically include four basic elements: an anode (20), a cathode (22), an electrolyte (PEM) (24), and a catalyst (26) arranged on each side of the electrolyte (24).

The anode (20) is the negative post of the fuel cell and conducts electrons that are freed from hydrogen molecules such that the electrons can be used in an external circuit (21). The anode (20) includes channels (28) etched therein to disperse the hydrogen gas as evenly as possible over the surface of the catalyst (26).

The cathode (22) is the positive post of the fuel cell, and has channels (30) etched therein to evenly distribute oxygen (usually air) to the surface of the catalyst (26). The cathode (22) also conducts the electrons back from the external circuit to the catalyst, where they can recombine with the hydrogen ions and oxygen to form water. Water is the only by-product of the PEM fuel cell.

The electrolyte (24) is the proton exchange membrane (PEM) (24). The PEM is a specially treated porous material that conducts only positively charged ions. The PEM (24) prevents the passage of electrons.

The catalyst (26) is typically a platinum powder thinly coated onto carbon paper or cloth. The catalyst (26) is usually rough and porous so as to maximize the surface area of the platinum that can be exposed to the hydrogen or oxygen. The catalyst (26) facilitates the reaction of oxygen and hydrogen.

In a working fuel cell, the PEM (24) is sandwiched between the anode (20) and the cathode (22). The operation of the fuel cell can be described generally as follows. Pressurized hydrogen gas ($H_2$) enters the fuel cell on the anode (20) side. When an $H_2$ molecule comes into contact with the platinum on the catalyst (26), it splits into two $H^+$ ions and two electrons ($e^-$). The electrons are conducted through the anode (20), where they make their way through the external circuit (21) that may be providing power to do useful work (such as turning a motor or lighting a bulb (23)) and return to the cathode side of the fuel cell.

Meanwhile, on the cathode (22) side of the fuel cell, oxygen gas ($O_2$) is being forced through the catalyst (26). In some PEM fuel cell systems the $O_2$ source may be air. As $O_2$ is forced through the catalyst (26), it forms two oxygen atoms, each having a strong negative charge. This negative charge attracts the two $H^+$ ions through the PEM (24), where they combine with an oxygen atom and two of the electrons from the external circuit to form a water molecule ($H_2O$).

The PEM fuel cell reaction just described produces only about 0.7 volts, therefore, to raise the voltage to a more useful level, many separate fuel cells are often combined to form a fuel cell stack.

PEM fuel cells typically operate at fairly low temperatures (about 80° C./176° F.), which allows them to warm up quickly and to be housed in inexpensive containment structures because they do not need any special materials capable of withstanding the high temperatures normally associated with electricity production.

Hydrogen Generation for Fuel Cells

As discussed above, each of the fuel cells described uses oxygen and hydrogen to produce electricity. The oxygen required for a fuel cell is usually supplied by the air. In fact, for the PEM fuel cell, ordinary air at ambient conditions is pumped into the cathode. However, hydrogen is not as readily available as oxygen.

Hydrogen is difficult to generate, store and distribute. One common method for producing hydrogen for fuel cells is the use of a reformer. A reformer uses hydrocarbons or alcohol fuels to produce hydrogen, which is then fed to the fuel cell. Unfortunately, reformers are problematic. If the hydrocarbon fuel is gasoline or some of the other common hydrocarbons, then $SO_x$, $NO_x$ and other undesirable products are created. Sulfur, in particular, must be removed or it can damage the electrode catalyst. Reformers usually operate at high temperatures as well, which consumes much of the energy of the feedstock material.

Hydrogen may also be created by low temperature chemical reactions utilizing a fuel source in the presence of a catalyst. However, many problems are associated with low temperature chemical reactions for producing hydrogen. One of the primary problems is the requirement for pumps to move the chemical mixture into a reaction chamber filled with a catalytic agent. The use of a pump consumes at least some of the power that the fuel cell is generating (called parasitic power). If the power consumed by the pump becomes too high, the operation of the fuel cell to produce electricity becomes uneconomical.

Further, the chemical mixture provided to the reaction chamber must be accurately metered to facilitate a chemical reaction that will efficiently generate electric power. Accurate metering equipment adds expense, complexity, and sensitivity to the pumping system and increases the parasitic power consumption. Typical fuel cell systems are also usually orientation-specific, meaning that metering of the chemical mixture can only be done when the fuel cell system is in certain orientations. Orientation-specific fuel cell systems limit their usefulness for portable consumer electronics and other devices that may be used in multiple and changing orientations.

In addition, another challenge to using fuel cells in portable consumer products such as digital cameras and laptop computers is providing a hydrogen fuel source that is safe and energy-dense. While there have been fuel cell systems used to generate electricity (such as systems that use the PEM fuel cell described above), they are typically not small or dense enough to be used in most portable consumer products.

BRIEF DESCRIPTION OF THE DRAWINGS

The accompanying drawings illustrate various embodiments of the principles described herein and are a part of the specification. The illustrated embodiments are merely examples and do not limit the scope of the claims.

In the drawings, identical reference numbers indicate similar, but not necessarily identical, elements.

DETAILED DESCRIPTION OF ILLUSTRATED EMBODIMENTS

Illustrative embodiments of the principles disclosed herein are described below. As will be appreciated by those skilled in the art, these principles can be implemented in a wide variety of chemical reactions especially those for producing hydrogen for fuel cells. The fuel cell applications include, but are not limited to, PEM fuel cells, AFCs, PAFCs, SOFCs, and MCFCs.

Figure 2:
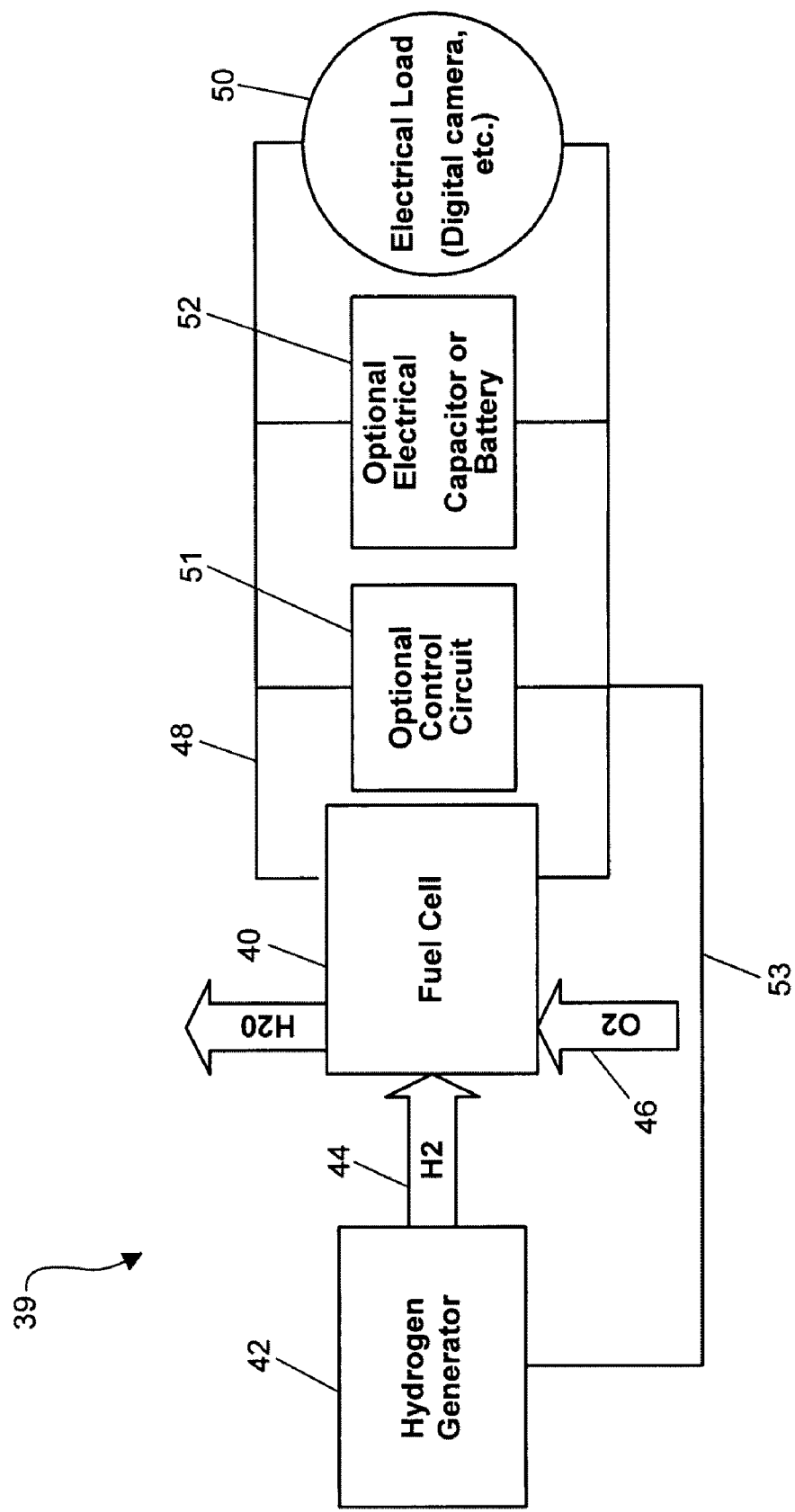
FIG. 2 is an overview diagram of an illustrative fuel cell apparatus according to one embodiment of principles described herein.

Turning now to the figures, and in particular to FIG. 2, an overview of an electronic device (39) using a fuel cell power system is shown according to one embodiment of the present invention. According to the embodiment of FIG. 2, there is a fuel cell (40) in fluid communication with a hydrogen generating apparatus, (42). The hydrogen generating apparatus (42) provides a supply of hydrogen gas along the path represented by the arrow (44). A supply of oxygen, that may be provided by ambient air, may also be in fluid communication with the fuel cell (40) as represented by another arrow (46). As shown in FIG. 2, water ($H_2O$) is produced as a byproduct of the operation of the fuel cell (40).

The fuel cell (40) may provide power via an external circuit (48) to an electrical load (50). An electrical load may include any electrically operated device including, but not limited to, a digital camera, a laptop computer, and other portable electronics. The external circuit (48) may also be connected to an optional voltage regulator/control circuit (51) and an electrical capacitor or battery (52) which are shown in electrical parallel with the fuel cell (40). The optional voltage regulator/control circuit (51) may include a feedback loop (53) for providing data to the hydrogen generating apparatus (42). The electrical capacitor or battery (52) may provide auxiliary power to the electrical load (50).

Figure 3:
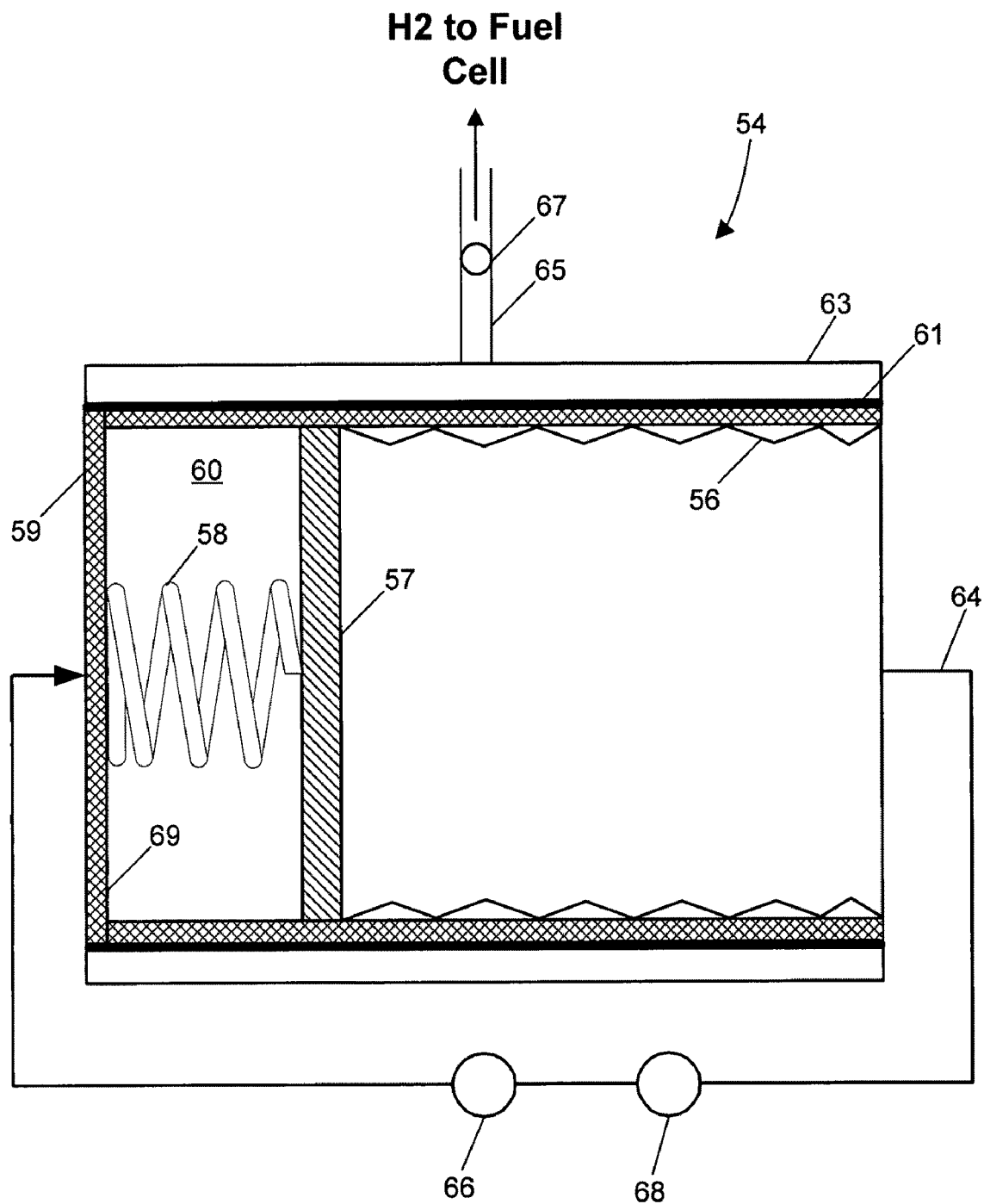
FIG. 3 is a diagrammatical view of an illustrative hydrogen generator according to one embodiment of principles described herein.

The hydrogen generating apparatus (42) provides hydrogen gas to the fuel cell (40) so as to drive an energy-producing chemical reaction within the fuel cell (40). The hydrogen generating apparatus (42) may take many different forms. Referring to FIG. 3, one possible embodiment of the hydrogen generating apparatus (42; FIG. 2)) is shown. According to the embodiment of FIG. 3, the hydrogen generating apparatus is a hydrogen cartridge (54) that may be coupled to a fuel cell but is separate and independent from the fuel cell. Alternatively, the hydrogen cartridge (54) may be integral with the fuel cell. The hydrogen cartridge (54) includes a chemical reaction chamber (60) and a chemical solution reservoir, which is shown in the present embodiment as a fresh solution bag (56) containing a supply of hydrogen-bearing fuel. The hydrogen-bearing fuel in the fresh solution bag (56) is fed into the reaction chamber (60), for example, through tubing (64) and a catalyst bed (59), as will be described further below. The hydrogen-bearing fuel may include, but is not limited to, an aqueous metal hydride such as sodium borohydride, and an amine borane, each of which produce hydrogen gas. The fresh solution bag (56) is preferably a flexible bag made of plastics, elastomers, or other materials that are generally deformable and capable of containing fluid solutions.

Arranged about the fresh solution bag (56) may be an unpowered pressure-producing member, for example, a lightweight spring (58), located adjacent to the fresh solution bag (56). The term "unpowered" signifies that the pressure-producing member does not consume electrical energy to operate, nor does it require power from a motor. The spring (58) may include one or more members biased toward the fresh solution bag (56) to increase the pressure of the hydrogen-bearing fuel contained inside the fresh solution bag (56). In the embodiment shown, a plate (57) may be disposed between the fresh solution bag (56) and the spring (58). The pressure of the spring (58) is exerted on the plate (57), which, in turn, presses in upon the fresh solution bag (56). However, in some embodiments the plate (57) is not used and the spring (58) and fresh solution bag (56) are in direct contact.

According to the arrangement of the FIG. 3 the fresh solution bag (56) is indirectly exposed to the pressure of the chemical reaction chamber (60) via the plate (57). Additionally, as the chemical reaction chamber (60) pressurizes during operation, the plate (57) transfers that operational pressure to the fresh solution bag (56) in addition to pressure caused by the spring (58). Consequently, the spring (58), or other pressure-producing member, can be a very low-force pressure-producing member and still initiate fuel flow from the fresh solution bag (56), through the tubing (64) and into to the chemical reaction chamber (60) at any chemical reaction chamber (60) pressure. Accordingly, because the fresh solution bag (56) is always exposed to the chemical reaction chamber (60) pressure, the low-force pressurizing member may be low-force and light-weight. In the present embodiment the low-force pressurizing member is the light-weight spring (58). In other embodiments, the fresh solution bag (56) pressure may be generated by an elastomer in the form of either the bag material itself or some other form. Further, the chemical reaction chamber (60) which contains the fresh solution bag (56) may be light-weight and smaller than a conventional reactor because it does not need to be large and stiff enough to handle high force (and therefore a larger) spring.

The spring (58) of the present embodiment is disposed inside the chemical reaction chamber (60) between a wall (69) of the chemical reaction chamber (60) and the plate (57). Accordingly, the spring (58) applies a force to the fresh solution bag (56) via the plate (57) and facilitates movement of the hydrogen-bearing fuel from the fresh solution bag (56), through a porous distributed catalyst bed (59), and into the chemical reaction chamber (60). The distributed catalyst bed (59) may be substantially surrounding the chemical reaction chamber (60). In the embodiment shown, the distributed catalyst bed (59) is arranged about the sides of the chemical reaction chamber (60), but other arrangements may also be suitable. The distributed catalyst bed (59) is porous and may be supported by a wire or polymer mesh. The distributed catalyst bed (59) may include, but is not limited to, a noble metal catalyst such as ruthenium, rhodium, or platinum. The distributed catalyst bed (59) may include other metals such as nickel. The plate (57), the spring (58) and any other components may also be coated with a catalyst to further facilitate the chemical reaction.

The chemical reaction chamber (60) may include a wide variety of materials according to the reactants used to produce the hydrogen gas. The chemical reaction chamber (60) may be flexible or rigid, although in the present embodiment the chemical reaction chamber (60) is rigid. According to the embodiment of FIG. 3, the distributed catalyst bed (59) is at least partially surrounded by a hydrophobic membrane (61). This membrane (61) is preferably disposed around an outer surface of the catalyst bed (59) and not between the catalyst bed (59) and the fresh solution bag (56). The hydrophobic membrane (61) allows the passage of gases such a hydrogen gas produced from a solution of sodium borohydride, but it does not allow the passage of liquids. Therefore, hydrogen gas produced in the reaction chamber (60) passes through the hydrophobic membrane (61) and into a gas collection chamber (63) arranged about the hydrophobic membrane (61). The hydrophobic membrane may include a variety of materials, including, but not limited to, Celgard® and Gore-Tex®.

The gas collection chamber (63) includes one or more fluid communications paths, such as a port (65), for supplying hydrogen gas to, for example, a fuel cell. A relief valve (67) may optionally be included in the port (65) for protection against overpressure. Another valve (not shown) may optionally be included for opening and closing the port (65) as needed.

As noted above, the movement of the hydrogen-bearing fuel from the fresh solution bag (56) to the chemical reaction chamber (60) may be facilitated by a fluid communication path such as a tubing (64). According to the embodiment shown in FIG. 3, the tubing (64) or other fluid communication path is external to the reaction chamber (60) and runs between the fresh solution bag (156) and a portion of the chemical reaction chamber (60) dedicated to conducting the chemical reaction, but this is not necessarily so. The tubing (64) may also be contained entirely within the chemical reaction chamber (60).

In addition, the flow of the hydrogen-bearing fuel from the fresh solution bag (56) to the chemical reaction chamber (60) may be controlled by a valve, such as a micro-valve (66). The micro-valve (66) may be arranged at any convenient location along the tubing (64) or other fluid communication path for controlling the flow from the fresh solution bag (56). The micro-valve (66) is available from a variety of commercial sources. The micro-valve (66) is preferably normally closed.

The valve (66) is preferably controlled by sending a series of signal pulses to the valve (66). The valve (66) is opened by arrival of a pulse and kept open for the duration of the pulse. Consequently, the volume of fuel flowing through the valve (66) can be controlled in a variety of ways, e.g., by controlling the time between pulses (micro-valve (66) pulsing frequency), the pulse width (duration the micro-valve (66) is held open), and/or valve aperture size. Variable aperture size control indicates analog control of how far open or closed the micro-valve is. The micro-valve (66) may thus enable precise control of the flow of the hydrogen-bearing fuel into the chemical reaction chamber (60). Alternatively, the micro-valve (66) may be mechanically operated by hand or by other mechanical apparatus. When hydrogen gas is needed, the micro-valve (66) is opened to allow the hydrogen-bearing fuel, pressurized by the spring (58), to flow into the reaction chamber (60). An optional relief and/or check valve (68) may also be included. In the embodiment shown, the relief and/or check valve (68) is located upstream of the micro-valve (66), but this is not necessarily so. Relief and/or check valves, such as the one shown, may be inserted at any point along the tubing (64). The relief and/or check valves (68) are commercially available from a number of different sources.

Figure 1:
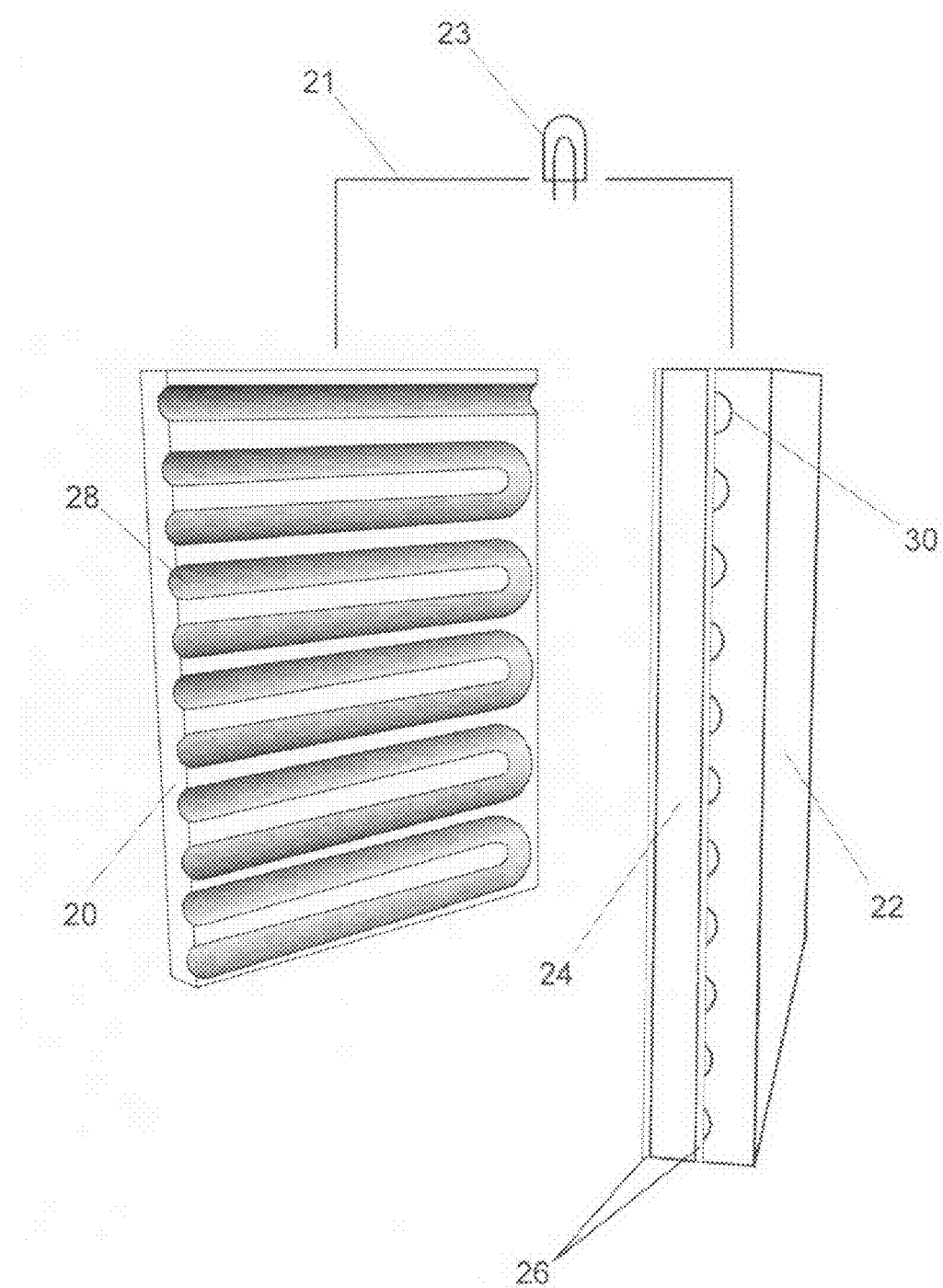
FIG. 1 is an unassembled perspective view of a PEM fuel cell apparatus according to principles described herein.

Operation of the hydrogen cartridge (54) may be described as follows. A hydrogen-bearing fuel source, such as sodium borohydride is inserted into the fresh solution bag (56). In some embodiments, the fresh solution bag (56) may be inserted separately against the spring (58) after being filled. Alternatively, the fresh solution bag (56) may be filled while in the arrangement shown in FIG. 3. The spring (58) is arranged adjacent to and biased toward the fresh solution bag (56) and therefore pressurizes the sodium borohydride or other hydrogen-bearing fuel contained by the fresh solution bag (56). The potential energy stored in the spring (58) (when compressed) provides chemical solution-moving power without adding to parasitic losses in the way that the pumps of prior hydrogen-generating systems do. When hydrogen gas is needed by a fuel cell to provide an electrical current, the micro-valve (66) may be opened or oscillated to allow pressurized hydrogen-bearing fuel, such as sodium borohydride, to move from the fresh solution bag (56) to the chemical reaction chamber (60) via the tubing (64). The hydrogen-bearing fuel passes through the distributed catalyst bed (59), and it generates hydrogen gas as it enters the chemical reaction chamber (60). The hydrogen gas released from the hydrogen-bearing fuel then passes through the catalyst bed (59) and the hydrophobic membrane (61) and into the gas collection chamber (63) where is can be supplied, for example, to a fuel cell such as the fuel cell apparatus of FIGS. 1 and 2.

In some embodiments, the reaction chamber (60) may be supplied initially with water to fill any voids in the reaction chamber (60) and maximize volume utilization. And, because sodium borohydride mixes well with water, the concentration of the sodium borohydride in the fresh solution bag (56) may be slightly higher than would otherwise be used.

Prior hydrogen generating apparatus have required pumps of one kind or another to move the supply of hydrogen-bearing fuel from a reservoir to a reaction chamber. As indicated above, pumps add significantly to the parasitic losses of a fuel cell apparatus and occupy space, limiting the energy density available for the fuel cell apparatus. Advantageously, the system described herein decreases parasitic loss and reduces space requirements by providing a mechanical pressure source to facilitate movement of the hydrogen-bearing fuel from a reservoir to a reaction chamber.

According to the embodiment of FIG. 3, the energy density of the hydrogen cartridge (54) is increased over conventional hydrogen generators by the containment of the fresh solution bag (56) within the reaction chamber (60). The plate (57) separating the reaction chamber (60) from the fresh solution bag (58) in the present embodiment is movable as a piston (58, 57) to compress the fresh solution bag (58) as the fresh solution is transferred into the reaction chamber (60). Therefore, as the fresh solution bag (58) is compressed, the useful volume of the reaction chamber (60) increases to utilize the volume formerly occupied by the fresh solution bag (58).

It will be appreciated by those of skill in the art having the benefit of this disclosure that the embodiments described advantageously provide for metering of a hydrogen-bearing fuel source to a chemical reaction chamber in an orientation-independent manner. That is, the hydrogen generating apparatus (42, 54.) may be operable in any orientation because the pressure-producing members provide a pressure differential between the fresh solution bag (56) and the reaction chamber (60) in any orientation. This may be especially important for fuel cell applications in portable electronics, which are often moved and reoriented in many different ways. In addition, some embodiments may use only a single control valve (66), reducing the occurrence of failures present in prior hydrogen generating systems that require pumps and multiple control valves.

Figure 4:
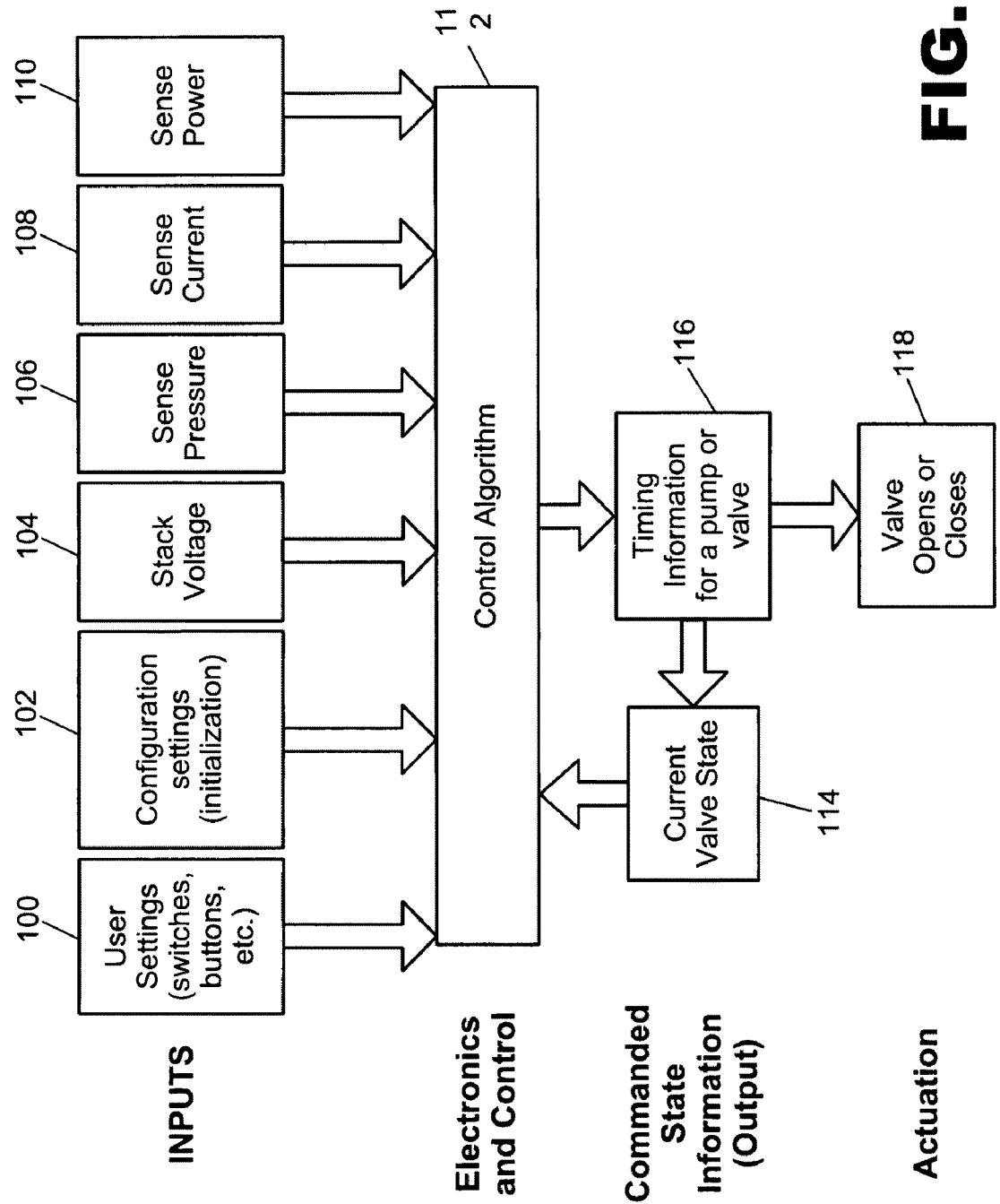
FIG. 4 is a conceptual diagram of an illustrative control structure for a hydrogen generator according to an embodiment of principles described herein.

Each of the embodiments described above preferably include a control valve to meter the transfer of a hydrogen-bearing fuel, such as sodium borohydride, from a chemical reservoir to a reaction chamber. Control of the hydrogen generation is facilitated by the control valve, such as the micro-valve (66) described above. Referring next to FIG. 4, a diagram of a control scheme for the hydrogen generating apparatus is shown according to one embodiment. The inputs to the control scheme may include, but are not limited to, user settings (100); configuration settings (102); fuel cell stack voltage levels (104); reservoir, hydrogen gas, and/or reactor pressure (106); fuel cell current levels (108); and fuel cell power levels (110).

The user settings (100) may be provided using any type of user input device, including, for example, switches, buttons, and the like, that a user may operate to control the state of the control valve directly. The configuration settings (102) may include an initialization routine to initialize the control scheme and set operating parameters. It will be appreciated that one or more of the inputs (100-110) may be fed into a control algorithm (112) to control the hydrogen generating apparatus.

The control algorithm (112) may include all the necessary programming and electronics to receive various inputs, analyze the input received, and provide appropriate and corresponding control signals to the control valve. The control algorithm may thus be implemented by a digital electronic controller, an analog electronic controller, or a mechanical controller. The control algorithm may use any or all of the inputs (100-110) to issue command state information (output). The command state information may include the current valve state (114) indicative of valve position (open/closed), and/or timing information (116) indicating valve operating frequency.

Depending on the control algorithm output, the control valve may be opened or closed (118) to control the flow of chemical solution from a reservoir to a reaction chamber, and thus the rate of hydrogen production. In embodiments where the electronic controller monitors the stack voltage of a fuel cell, the electronic controller may adjust one or more of the frequency, pulse width, or aperture size of the micro-valve (66; FIG. 3) in response to changes in stack voltage. The electronic controller may increase the frequency, pulse width, or aperture size of the micro-valve (66; FIG. 3) in response to a monitored stack voltage below a predetermined threshold, or the controller may decrease the frequency, pulse width, or aperture size of the micro-valve (66; FIG. 3) in response to a monitored stack voltage above a predetermined threshold.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. An electronic device comprising a fuel cell and a hydrogen generating apparatus, said device comprising:
    a chemical reaction chamber;
    a chemical solution reservoir;
    an unpowered pressure-producing member configured to provide a pressure at said chemical solution reservoir that moves a chemical solution from said chemical solution reservoir to said chemical reaction chamber; and
    a catalyst bed disposed in said chemical reaction chamber.

2. The device of claim 1, further comprising a hydrophobic membrane disposed between said chemical reaction chamber and said fuel cell.

3. The device of claim 1, wherein said unpowered pressure-producing member comprises a spring biased toward compression of said chemical solution reservoir.

4. The device of claim 1, wherein said chemical solution reservoir is disposed at least partially in said chemical reaction chamber.

5. An electronic device comprising a fuel cell and a hydrogen generating apparatus, said device comprising:
    said fuel cell; and
    said hydrogen generator for providing hydrogen gas to said fuel cell; said hydrogen generator comprising:
        a chemical reaction chamber substantially surrounded by a distributed catalyst bed; and
        a fuel solution reservoir disposed at least partially within said reaction chamber.

6. The apparatus of claim 5, wherein said fuel solution reservoir is maintained at a pressure greater than a pressure in said reaction chamber by a biasing force applied to said fuel solution reservoir.

7. The apparatus of claim 6, wherein said biasing force is provided by a spring.

8. The apparatus of claim 5, further comprising a mixture of aqueous sodium borohydride disposed in said fuel solution reservoir and a fluid communication path to supply said aqueous sodium borohydride from said fuel solution reservoir to said distributed catalyst bed through a valve.

9. A method of generating hydrogen comprising applying a biasing force to a flexible bag containing a fuel solution to move said fuel solution from said flexible bag to a reaction chamber substantially surrounded by a distributed catalyst bed.

10. The method of claim 9, further comprising controlling a valve disposed between said flexible bag and said reaction chamber to meter movement of said fuel solution from said flexible bag through said distributed catalyst bed substantially surrounding said reaction chamber.

11. The method of claim 10, further comprising monitoring one or more of a fuel cell stack voltage, user settings, configuration settings, hydrogen gas pressure, fuel cell current, and fuel cell power; and controlling said valve according to said monitoring.

12. A device comprising a cartridge containing a hydrogen generating apparatus for producing hydrogen as an input for a fuel cell, said hydrogen generating apparatus comprising:

a chemical reaction chamber;

a chemical solution reservoir;

an unpowered pressure-producing member configured to provide a pressure at said chemical solution reservoir that moves a chemical solution from said chemical solution reservoir to said chemical reaction chamber; and a catalyst bed disposed in said chemical reaction chamber for producing hydrogen from said chemical solution.

13. The device of claim 12, wherein said chemical reaction chamber is rigid and said chemical solution reservoir is flexible and contained within said chemical reaction chamber.

14. The device of claim 13, wherein an effective volume of said chemical reaction chamber increases and an effective volume of said chemical solution reservoir decreases as said chemical solution moves from said chemical solution reservoir to said chemical reaction chamber.

15. The device of claim 12, further comprising a hydrophobic membrane disposed about said catalyst bed.

* * * * *

UNITED STATES PATENT AND TRADEMARK OFFICE
CERTIFICATE OF CORRECTION

PATENT NO. : 7,655,056 B2 Page 1 of 1
APPLICATION NO. : 11/985633
DATED : February 2, 2010
INVENTOR(S) : John A. Devos It is certified that error appears in the above-identified patent and that said Letters Patent is hereby corrected as shown below:

In column 8, line 54, in Claim 9, after "force" insert -- using an unpowered pressure producing member --.

Signed and Sealed this

Eleventh Day of May, 2010

David J. Kappos
*Director of the United States Patent and Trademark Office*